(12) United States Patent
Varsavsky Waisman-Diamond

(10) Patent No.: US 10,728,396 B2
(45) Date of Patent: *Jul. 28, 2020

(54) UNIFIED NETWORK OF WI-FI ACCESS POINTS

(71) Applicant: FON WIRELESS LIMITED, London (GB)

(72) Inventor: Martin Varsavsky Waisman-Diamond, Madrid (ES)

(73) Assignee: FON WIRELESS LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/409,834

(22) Filed: May 12, 2019

(65) Prior Publication Data
US 2019/0373113 A1    Dec. 5, 2019

Related U.S. Application Data

(60) Continuation of application No. 15/815,692, filed on Nov. 16, 2017, now Pat. No. 10,291,787, which is a
(Continued)

(51) Int. Cl.
*H04M 15/00* (2006.01)
*H04L 29/08* (2006.01)
(Continued)

(52) U.S. Cl.
CPC ........ *H04M 15/56* (2013.01); *H04L 65/1013* (2013.01); *H04L 67/20* (2013.01);
(Continued)

(58) Field of Classification Search
CPC ............. H04M 15/56; H04M 15/8044; H04M 15/8055; H04M 15/8038; H04W 16/00;
(Continued)

(56) References Cited

U.S. PATENT DOCUMENTS 6,184,710 B1   2/2001   Mendel
6,298,383 B1   10/2001  Gutman et al.
(Continued)

FOREIGN PATENT DOCUMENTS

CN        101399671        4/2009
EP         1104133         5/2001
(Continued)

OTHER PUBLICATIONS

Meddahi, A. et al, "Enabling secure third party control on wireless home networks," ENIC Telecom Lille, France Conf. 2004 4th Workshop on Applications and Services in Wireless Networks (ASWN), Aug. 9-11, 2004, Boston, MA, USA, pp. 46-54 Publisher: IEEE, Piscataway, NJ, USA , 2004.
(Continued)

*Primary Examiner* — Brian T O Connor
(74) *Attorney, Agent, or Firm* — Siritzky Law, PLLC

(57) ABSTRACT

A plurality of users are associated with a system having at least one information processor coupled to a communication network. Multiple wireless access points to the communication network are provided; and multiple of the users associated with the system are provided access to the communication network via the access points.

19 Claims, 5 Drawing Sheets

Related U.S. Application Data continuation of application No. 14/826,407, filed on Aug. 14, 2015, now Pat. No. 9,826,102, which is a continuation of application No. 14/513,197, filed on Oct. 13, 2014, now Pat. No. 9,125,170, which is a continuation of application No. 13/657,043, filed on Oct. 22, 2012, now Pat. No. 9,088,955, which is a continuation of application No. 13/350,344, filed on Jan. 13, 2012, now Pat. No. 8,306,502, which is a continuation of application No. 13/042,936, filed on Mar. 8, 2011, now Pat. No. 8,126,430, which is a division of application No. 11/402,576, filed on Apr. 12, 2006, now Pat. No. 7,924,780.

(51) Int. Cl.

| | | |
|---|---|---|
| H04W 4/24 | (2018.01) | |
| H04L 29/06 | (2006.01) | |
| H04W 16/00 | (2009.01) | |
| H04L 12/24 | (2006.01) | |
| H04W 88/08 | (2009.01) | |
| H04W 84/12 | (2009.01) | |
| H04W 88/16 | (2009.01) | |
| H04W 48/16 | (2009.01) | |
| H04W 48/18 | (2009.01) | |

(52) U.S. Cl.
CPC ... *H04M 15/8038* (2013.01); *H04M 15/8044* (2013.01); *H04M 15/8055* (2013.01); *H04W 4/24* (2013.01); *H04W 16/00* (2013.01); *H04L 41/0896* (2013.01); *H04L 65/80* (2013.01); *H04W 48/16* (2013.01); *H04W 48/18* (2013.01); *H04W 84/12* (2013.01); *H04W 88/08* (2013.01); *H04W 88/16* (2013.01)

(58) Field of Classification Search
CPC ....... H04W 4/24; H04W 88/08; H04W 84/12; H04W 88/16; H04W 48/16; H04W 48/18; H04L 65/1013; H04L 67/20; H04L 41/0896; H04L 65/80
See application file for complete search history.

(56) References Cited

U.S. PATENT DOCUMENTS

| | | | |
|---|---|---|---|
| 6,430,619 B1 | 8/2002 | Sitaraman et al. | |
| 6,732,176 B1 | 5/2004 | Stewart et al. | |
| 6,795,700 B2 | 9/2004 | Karaoguz et al. | |
| 6,813,496 B2 | 11/2004 | Numminen et al. | |
| 6,842,770 B1 | 1/2005 | Serlet et al. | |
| 6,934,530 B2 | 8/2005 | Engelhart | |
| 6,938,076 B2 | 8/2005 | Meyer et al. | |
| 6,950,628 B1 | 9/2005 | Meier et al. | |
| 6,957,069 B2 | 10/2005 | Shah et al. | |
| 6,957,086 B2 | 10/2005 | Bahl et al. | |
| 6,961,575 B2 | 11/2005 | Stanforth | |
| 7,136,655 B2 | 11/2006 | Skafidas et al. | |
| 7,251,827 B1 | 7/2007 | Guo et al. | |
| 7,263,076 B1 | 8/2007 | Leibovitz et al. | |
| 7,266,089 B2 | 9/2007 | Cook | |
| 7,296,078 B2 | 11/2007 | Sanchez Herrero et al. | |
| 7,302,229 B2 | 11/2007 | Riddles | |
| 7,428,413 B2 | 9/2008 | Fink | |
| 7,499,438 B2 | 3/2009 | Hinman et al. | |
| 7,532,604 B2 | 5/2009 | Eglin | |
| 7,535,880 B1 | 5/2009 | Hinman et al. | |
| 7,568,218 B2 | 7/2009 | Garg et al. | |
| 7,673,328 B1 | 3/2010 | Kojima | |
| 7,711,097 B2 | 5/2010 | Ji et al. | |
| 7,761,094 B2 | 7/2010 | Stein et al. | |
| 7,849,173 B1 | 12/2010 | Uhlik | |
| 7,924,780 B2 * | 4/2011 | Waisman-Diamond | G06Q 20/10 370/329 |
| 7,995,993 B1 | 8/2011 | Varsavsky | |
| 8,091,116 B2 | 1/2012 | Kutt et al. | |
| 8,126,430 B2 * | 2/2012 | Varsavsky Waisman-Diamond | G06Q 20/10 455/406 |
| 8,130,768 B1 | 3/2012 | Ahrens et al. | |
| 8,179,840 B2 | 5/2012 | O'Neill | |
| 8,189,574 B2 | 5/2012 | Stein et al. | |
| 8,195,182 B2 | 6/2012 | Fink | |
| 8,213,934 B2 | 7/2012 | Tsirtsis et al. | |
| 8,266,266 B2 | 9/2012 | Short et al. | |
| 8,306,502 B2 * | 11/2012 | Varsavsky Waisman-Diamond | G06Q 20/10 455/406 |
| 8,319,835 B2 | 11/2012 | Azuma et al. | |
| 8,332,923 B2 | 12/2012 | Oba et al. | |
| 8,391,299 B2 | 3/2013 | Schliserman et al. | |
| 8,725,138 B2 | 5/2014 | Lee et al. | |
| 9,088,955 B2 * | 7/2015 | Varsavsky Waisman-Diamond | G06Q 20/10 |
| 9,125,170 B2 * | 9/2015 | Varsavsky Waisman-Diamond | G06Q 20/10 |
| 9,826,102 B2 * | 11/2017 | Varsavsky Waisman-Diamond | H04M 15/8044 |
| 10,291,787 B2 * | 5/2019 | Varsavsky Waisman-Diamond | H04W 16/00 |
| 2001/0053683 A1 | 12/2001 | Murayama et al. | |
| 2002/0035617 A1 | 3/2002 | Lynch et al. | |
| 2002/0046179 A1 | 4/2002 | Kokudo | |
| 2002/0075844 A1 | 6/2002 | Hagen | |
| 2002/0138635 A1 | 9/2002 | Redlich et al. | |
| 2002/0151300 A1 | 10/2002 | Suda et al. | |
| 2003/0051041 A1 | 3/2003 | Kalavade et al. | |
| 2003/0169713 A1 | 9/2003 | Luo | |
| 2003/0210671 A1 | 11/2003 | Eglin | |
| 2003/0223558 A1 | 12/2003 | Trabandt et al. | |
| 2003/0233580 A1 | 12/2003 | Keeler et al. | |
| 2003/0236717 A1 | 12/2003 | Honour et al. | |
| 2004/0052223 A1 | 3/2004 | Karaoguz et al. | |
| 2004/0053613 A1 | 3/2004 | Karaoguz et al. | |
| 2004/0122959 A1 | 6/2004 | Lortz | |
| 2004/0133687 A1 | 7/2004 | Yamaguchi et al. | |
| 2004/0141617 A1 | 7/2004 | Volpano | |
| 2004/0181602 A1 | 9/2004 | Fink | |
| 2004/0203740 A1 | 10/2004 | Won et al. | |
| 2004/0260760 A1 | 12/2004 | Curnyn | |
| 2005/0021781 A1 | 1/2005 | Sunder et al. | |
| 2005/0048950 A1 | 3/2005 | Morper | |
| 2005/0050352 A1 | 3/2005 | Narayanaswami et al. | |
| 2005/0080884 A1 | 4/2005 | Siorpaes et al. | |
| 2005/0086346 A1 | 4/2005 | Meyer | |
| 2005/0096048 A1 | 5/2005 | Clare et al. | |
| 2005/0114680 A1 | 5/2005 | Chinnaswamy et al. | |
| 2005/0148321 A1 | 7/2005 | Igarashi et al. | |
| 2005/0164704 A1 | 7/2005 | Winsor | |
| 2005/0177515 A1 | 8/2005 | Kalavade et al. | |
| 2005/0198337 A1 | 9/2005 | Sun et al. | |
| 2005/0198534 A1 | 9/2005 | Matta et al. | |
| 2005/0204037 A1 | 9/2005 | Levy | |
| 2005/0220106 A1 | 10/2005 | Raverdy et al. | |
| 2005/0223086 A1 | 10/2005 | Raverdy et al. | |
| 2005/0232242 A1 | 10/2005 | Karaoguz et al. | |
| 2005/0232283 A1 | 10/2005 | Moyer et al. | |
| 2005/0233740 A1 | 10/2005 | Jiang | |
| 2005/0250448 A1 | 11/2005 | Knauerhase et al. | |
| 2005/0260972 A1 | 11/2005 | Karaoguz et al. | |
| 2005/0270998 A1 | 12/2005 | Rambo et al. | |
| 2005/0271020 A1 | 12/2005 | Thermond | |
| 2006/0041931 A1 | 2/2006 | Boxall et al. | |
| 2006/0153122 A1 | 7/2006 | Hinman et al. | |
| 2006/0187850 A1 | 8/2006 | Ward et al. | |
| 2006/0188080 A1 | 8/2006 | Terpstra et al. | |
| 2006/0223527 A1 | 10/2006 | Lee et al. | |
| 2006/0239254 A1 | 10/2006 | Short et al. | |
| 2006/0258285 A1 | 11/2006 | Riddles | |

(56) References Cited

U.S. PATENT DOCUMENTS

| | | |
|---|---|---|
| 2006/0274743 A1 | 12/2006 | Yegin et al. |
| 2007/0008885 A1 | 1/2007 | Bonner |
| 2007/0064647 A1 | 3/2007 | Prasad |
| 2007/0082654 A1 | 4/2007 | Hovnanian et al. |
| 2007/0087756 A1 | 4/2007 | Hoffberg |
| 2007/0094401 A1 | 4/2007 | Gagne et al. |
| 2007/0124802 A1 | 5/2007 | Anton et al. |
| 2007/0147324 A1 | 6/2007 | McGary |
| 2007/0167174 A1 | 7/2007 | Halcrow et al. |
| 2007/0226320 A1 | 9/2007 | Hager et al. |
| 2007/0254624 A1 | 11/2007 | Le Creff et al. |
| 2008/0059445 A1 | 3/2008 | De Bellis |
| 2008/0298275 A1 | 12/2008 | De Sousa |
| 2009/0135758 A1 | 5/2009 | Alper et al. |
| 2009/0172798 A1 | 7/2009 | Upp |
| 2009/0279492 A1 | 11/2009 | Montemurro et al. |
| 2010/0017525 A1 | 1/2010 | Albert et al. |
| 2010/0106572 A1 | 4/2010 | Van Hoff et al. |
| 2010/0235895 A1 | 9/2010 | Grassley et al. |
| 2010/0263022 A1 | 10/2010 | Wynn et al. |
| 2011/0047603 A1 | 2/2011 | Gordon et al. |
| 2011/0088003 A1 | 4/2011 | Swink et al. |
| 2011/0154454 A1 | 6/2011 | Frelechoux |
| 2011/0255459 A1 | 10/2011 | Gupta et al. |
| 2012/0054840 A1 | 3/2012 | Gupta |
| 2012/0149334 A1 | 6/2012 | Zhang et al. |
| 2012/0158979 A1 | 6/2012 | Lee et al. |

FOREIGN PATENT DOCUMENTS

| | | |
|---|---|---|
| EP | 1357720 | 10/2003 |
| EP | 1411676 | 4/2004 |
| EP | 1550264 | 7/2005 |
| EP | 1643719 | 4/2006 |
| GB | 2440193 | 1/2008 |
| JP | 2007049503 | 2/2007 |
| JP | 2007281919 | 10/2007 |
| WO | WO03047294 | 6/2003 |
| WO | WO2007093216 | 8/2007 |
| WO | WO2008040697 | 4/2008 |
| WO | WO2009114976 | 9/2009 |
| WO | WO2010019084 | 2/2010 |
| WO | WO2012119450 | 9/2012 |

OTHER PUBLICATIONS

Jain, S. et al, Wireless community networks, Dept. of Electr. & Comput. Eng. & Comput. Sci., Cincinnati Univ., OH, USA Computer, vol. 36, No. 8 , p. 90-92 Publisher: IEEE Comput. Soc., Aug. 2003.

http://www.pbs.org/newshour/bb/cyberspace/July-dec05/philadelphia.sub.--11----22.html, 6 pages. Nov. 22, 2005.

http://www.bwianews.com/, 27 pages. Dec. 1, 2005.

HighBeam Research, "Locals Surf Wi-Fi Wave: Businesses Give Away Web Access to Entice Paying Customers", HighBeam Research, copyright 2005, 4 pages.

http://www.cnn.com/2003/TECH/internet/12/11/sprj.ws.Wi-Fi.city.ap/, 2 pages. Dec. 17, 2003.

"Cellular Data Offload and Extending Wi-Fi Coverage with Devicescape Easy WiFi Case Study", Devicescape Software, Inc., Oct. 2010.

U.S. Appl. No. 14/513,197, filed Oct. 13, 2014.
U.S. Appl. No. 13/657,043, filed Oct. 22, 2012.
U.S. Appl. No. 13/350,344, filed Jan. 13, 2012.
U.S. Appl. No. 13/042,936, filed Mar. 8, 2011.
U.S. Appl. No. 13/080,224, filed Apr. 5, 2011.
U.S. Appl. No. 11/402,576, filed Apr. 12, 2006.

* cited by examiner

UNIFIED NETWORK OF WI-FI ACCESS POINTS

CROSS-REFERENCE TO RELATED APPLICATIONS

This patent application is a continuation of U.S. patent application Ser. No. 15/815,692, filed Nov. 16, 2017, which is a continuation of U.S. patent application Ser. No. 14/826,407, filed 2015 Aug. 14, issued as U.S. Pat. No. 9,826,102, Nov. 21, 2017, which is continuation of U.S. patent application Ser. No. 14/513,197, filed Oct. 13, 2014, titled "Linking Existing Wi-Fi Access Points Into Unified Network," now U.S. Pat. No. 9,125,170, which is a continuation of U.S. patent application Ser. No. 13/657,043, filed Oct. 22, 2012, titled "System And Method For Linking Existing Wi-Fi Access Points Into A Single Unified Network," now U.S. Pat. No. 9,088,955; which is a continuation of U.S. patent application Ser. No. 13/350,344, filed Jan. 13, 2012, now U.S. Pat. No. 8,306,502, which is a continuation of U.S. patent application Ser. No. 13/042,936, filed Mar. 8, 2011, now U.S. Pat. No. 8,126,430, which is divisional of U.S. patent application Ser. No. 11/402,576, filed Apr. 12, 2006, now U.S. Pat. No. 7,924,780, the entire contents of each of which are hereby fully incorporated by reference for all purposes.

BACKGROUND OF THE INVENTION

1. Field of the Invention

The present invention relates generally to networking and, more particularly, to linking existing Wi-Fi access points into a single unified community.

2. Description of the Related Art

Wireless networking for electronic devices, including, for example, computers, portable digital assistants ("PDAs"), cellular telephones, printers, digital cameras or the like has become very common and continues to grow in use and popularity throughout the world.

A widely used mobile platform is the so-called "3G" third-generation of wireless technology. 3G, based on the known Universal Mobile Telecommunications System ("UTMS") and wide-band Code-Division Multiple Access ("WCDMA"), purportedly increases data transmission rates for Global System for Mobile Communications ("GSM") systems and telephones.

Currently, a radio-based protocol, referred to generally herein and known in the art as wireless fidelity ("Wi-Fi"), invokes a standard communications protocol that enables wireless networking. In accordance with the known IEEE 802.11g protocol, as defined by the Institute of Electrical and Electronics Engineers, Inc. ("IEEE"), devices are able to transmit at a speed of 54 megabits per second ("Mbps"). The 802.11g standard operates in the 2.4 gigahertz (GHz) frequency band, and enables wireless transmissions within a limited range or distance, for example, under one thousand feet. Most residential Wi-Fi users employ the technology for wireless access to the Internet, typically to enable sharing of an Internet connection among several devices. Users also enjoy the wireless mobility Wi-Fi provides.

In a typical residential installation, a user installing a Wi-Fi network maintains an active Internet connection, thereby providing the bandwidth needed for wireless Internet connectivity. Although simple dial-up connections to the internet may function to provide wireless connectivity, a high-speed internet connection, for example, via digital subscriber line ("DSL"), cable television service, T1 or the like, is preferred. In addition, a combination of hardware and software is installed. For example, computing device(s) are installed with Wi-Fi adapter(s) (essentially a low powered radio device), and a wireless router that provides an "access point," also referred to in the art as a "gateway," which manages the internet communication among the devices and is provided as well. The devices and gateway typically require configuring to function. Once properly configured, the computing devices equipped with Wi-Fi adapters can share the Internet connection and access web sites without a need for hardwire connections.

Referring to the drawings, in which like reference numerals refer to like elements, FIG. 1 illustrates an example collection of devices that can be configured to transmit and/or receive information over a prior art Wi-Fi network. As shown in FIG. 1, information processor 102 (depicted as a laptop computer) is suitably equipped and operable to maintain a connection to the Internet. Coupled to information processor 102 is gateway 104, which operates to manage the communication among the devices shown in FIG. 1. The remaining devices are all configured with a form of Wi-Fi adapter suitable to wirelessly receive data via the Internet connection. For example, cameras 106, displays 108, printer 110, and audio devices 112 are operable to send and/or receive information via the gateway 104 and information processor 102.

Relatively recently, Wi-Fi has become affordable and accessible for residences, schools, offices, business establishments or the like. This is largely due to the affordable cost of hardware, such as described above, which is required to establish a Wi-Fi network. Unfortunately, the range of Wi-Fi networks remains relatively limited, although attempts have been made to increase the coverage.

Recently with the distribution of broadband Internet access, such as provided via DSL, Fiberoptic, Coaxial and new Wi-Fi connections, available Internet bandwidth has rapidly increased and improved. Accordingly, individual users have more bandwidth than they can utilize. In spite of bandwidth excess, no effective footprint has been created that can span, for example, across an entire country. The inventor believes that individual home users who possess excess bandwidth would be willing to permit other people use some of this extra bandwidth if they receive something in exchange.

As known in the art, telephone usage over the internet (i.e., voice over the internet protocol, "VoIP"), is also rapidly increasing. In short, voice information is sent digital data packets over the Internet instead of traditional methods using the public switched telephone network ("PSTN"). VoIP is currently interfacing with Wi-Fi, such that data packets of digital voice information are transmitted via Wi-Fi networks. As VoIP over Wi-Fi becomes common, roaming to and from various Wi-Fi connections becomes more significant. In particular, for example, Wi-Fi operable with GSM/UMTS phones is foreseen by the inventors to be widely distributed in the near future.

Currently, fees associated with cellular telephone service in Europe are, typically, much higher than in the United States. European countries continue to invest in broadband Internet connections, and Wi-Fi networking is rapidly disseminated. Further, Wi-Fi devices are being distributed at a record pace, and VoIP is becoming mainstream. The result is that users want real broadband Internet access, including for VoIP, everywhere.

VoIP is an attractive alternative to 3G for various reasons. The cost of 3G is high and the speed is limited. Mobile operators have paid enormous amounts of money for 3G licenses and they want the return on their investment but they do not have the bandwidth to compete with Wi-Fi. 3G operators do not offer easy access to the Internet. 3G promised "the internet in your pocket" but delivered a pay-per-view business model.

It is believed by the inventor that broadband penetration is reaching a critical mass, currently estimated at 20% of all households in USA and Europe. This penetration continues to grow at a strong pace. Furthermore, broadband speeds are increasing substantially, for example, from 1 Mbps up to 20 Mbps. It is further believed that users who maintain Internet connections that transmit up to 20 Mbps do not utilize their bandwidth and, accordingly, have bandwidth to spare. This is true throughout the European Union and in the United States.

Various factors have been driving the growth of Wi-Fi. For example, many laptop computers are equipped with built-in wireless technology (e.g., laptop computers configured with the known CENTRINO microchip processor). Also, dramatic reductions in the cost of Wi-Fi access point hardware, and reductions in costs associated with broadband Internet connections have contributed to the growth of Wi-Fi.

Another relatively recent development in VoIP is a software product known in the art and distributed as "SKYPE." SKYPE is a VoIP software application that is distributed without charge, and, in its basic form, enables users to record and playback audio. SKYPE is a peer-to-peer internet telephony network, founded by Niklas Zennström and Janus Friis, the creators of KAZAA. The network is provided by all combined users of the free desktop software application. SKYPE users can speak to other SKYPE users for free, call traditional telephone numbers for a fee, via an interface known in the art as SKYPEOut, can receive and make calls to traditional telephones, via an interface known in the art as SKYPEOut, and further can receive voicemail messages. SKYPE provides a versatile method of synchronous and asynchronous communication.

Millions of users have downloaded SKYPE, and as many as over three million users may be using the software at any given time. SKYPE is believed to be the second most downloaded software ever, second only to peer-to-peer software. Over time, improvements to SKYPE have been made, such as due to new codecs and higher bandwidth availability, and quality has been increased. One result is less expensive international phone calls. As a result, VoIP functionality can be provided for users, thereby providing a cost effective alternative to high telephone rates.

Notwithstanding the telephone cost savings associated with VoIP, users of VoIP, typically, are restricted to using the technology in close proximity to their broadband internet connections. Users that employ VoIP technology in conjunction with Wi-Fi are restricted to the range of transmission provided, for example, by the wireless access point.

Over time, businesses, organizations and/or individuals have unsuccessfully attempted to build an increased coverage Wi-Fi infrastructure. These attempts have been done by building their own infrastructure such as those by Deutche Telecom, Telefonica, France Telecom and others. They have failed due to the high cost involved and the lack of sufficient revenues. Some of the shortcomings associated with these attempts include a limited size, competition with private Wi-Fi networks and use.

For example, U.S. Pat. No. 6,795,700 (the "'700 patent") is directed to a "Method of Creating Incentives for Establishing Hotspot Locations". Disclosed is a service provider, such as a wireless telephone provider, landline telephone provider or other type of service provider that wishes to make use of wireless access points for their customers without creating an infrastructure for such services. The business model provides incentives for owners of existing wireless access points to become affiliated with a larger provider. In this manner, customers seeking service may make use of an affiliated wireless access "hotspot" where they connect to the hotspot, use the hotspot to access the service provider, are authenticated by the service provider and make use of the network to obtain the services desired. The system is controlled by software provided by the service provider and this software monitors activity from each hotspot. The level of activity is used to support revenue sharing thereby providing the hotspot provider with income supporting their infrastructure.

Although the '700 patent may teach providing incentives for establishing hotspot locations and teaches a model of persuading owners to become affiliated with a internet provider, the '700 patent is silent with regard to permitting members of a group to use each other's bandwidth for free, and charging a relatively small access fee for non-contributors.

Another patent, for example, U.S. Pat. No. 6,950,628 (the "628 patent") issued to Meier is entitled, "Method For Grouping 802.11 Stations Into Authorized Service Sets To Differentiate Network Access And Services." The '628 patent discloses a method for enabling an access point to associate a wireless station to either a home subnet or a virtual local area network ("VLAN") based on a configuration (e.g., a service set identifier or "SSID") stored locally at the access point. Each service set is an arbitrary grouping of one or more network service parameters, and is typically configured for either VLAN or proxy mobile IP host. When a wireless station desires to associate with an access point, the wireless station sends a message to the access point, the message containing an SSID. A security server is further configured with a list of allowed service set identifiers for each wireless station to prevent unauthorized access to a VLAN or home subnet.

Currently, some countries in the world, and in Europe in particular, impose no explicit or implicit restriction in telecom regulation, for example through legislation to limit the capacity of a broadband user for permitting the access to internet through his Wi-Fi connection.

In addition to regulations regarding telecoms, some internet service providers ("ISP's") impose contractual restrictions on consumers by insisting on no sharing/reselling bandwidth. Such contractual restrictions are case-specific, however, and many other ISPs allow end consumer to share bandwidth.

SUMMARY OF THE INVENTION

The present invention provides system and method for sharing wireless internet bandwidth in a cost effective and efficient way. In a preferred embodiment, at least one information processor is coupled to and accessible over a communication network, such as the internet. In a preferred embodiment, a server computer distributes software to registered users that enables a typical, prior art residential wireless router to operate as a network router. When the residential router is properly equipped with the software provided by the server and connected to the internet, the router registers itself as part of a wider network, and allows access to the Internet through that router for other users. In this way, a networked community of Wi-Fi users is established.

In particular, network bandwidth is provided to a first user of at least two end users for a first fee and to a second user of the at least two end users for a second fee. The bandwidth is provided by at least one network service provider.

Further, at least two wireless gateway devices are each respectively operated by the end users, and the wireless gateway devices are configured to provide wireless access to the communication network within a transmission range and to communicate with the at one least information processor. Also, at least two wireless receiving devices are provided that are operable to receive the respective bandwidth from the at least two wireless gateway devices when in transmission range. Preferably, the first user is authorized to use the second bandwidth and the second user is authorized to use the first bandwidth via the wireless devices. Thus a system and method of sharing bandwidth is provided.

In one embodiment, a fee to access the first and/or second bandwidth is charged to a third user. Also, a portion of the fee is distributed to the user providing the respective bandwidth. In one embodiment, the amount remunerated to the respective user is equal to one half of the fee.

In another embodiment, VoIP service is provided via the at least two respective wireless gateway devices, and a fee is charged to anyone who uses the VoIP service.

In yet another embodiment, the respective users receive free roaming access. In another embodiment, a fee is charged to a third user that is based upon the amount of time the bandwidth is actually used. In yet another embodiment, the fees are calculated to reflect network bandwidth used over the period of a minute, a day, a week, a month or a year.

Other features and advantages of the present invention will become apparent from the following description of the invention, which refers to the accompanying drawings.

DESCRIPTION OF THE DRAWINGS

For the purposes of illustrating the invention, there is shown in the drawings a form which is presently preferred, it being understood, however, that the invention is not limited to the precise arrangements and instrumentalities shown. The features and advantages of the present invention will become apparent from the following description of the invention that refers to the accompanying drawings, in which.

DETAILED DESCRIPTION OF THE PREFERRED EMBODIMENTS

Figure 1:
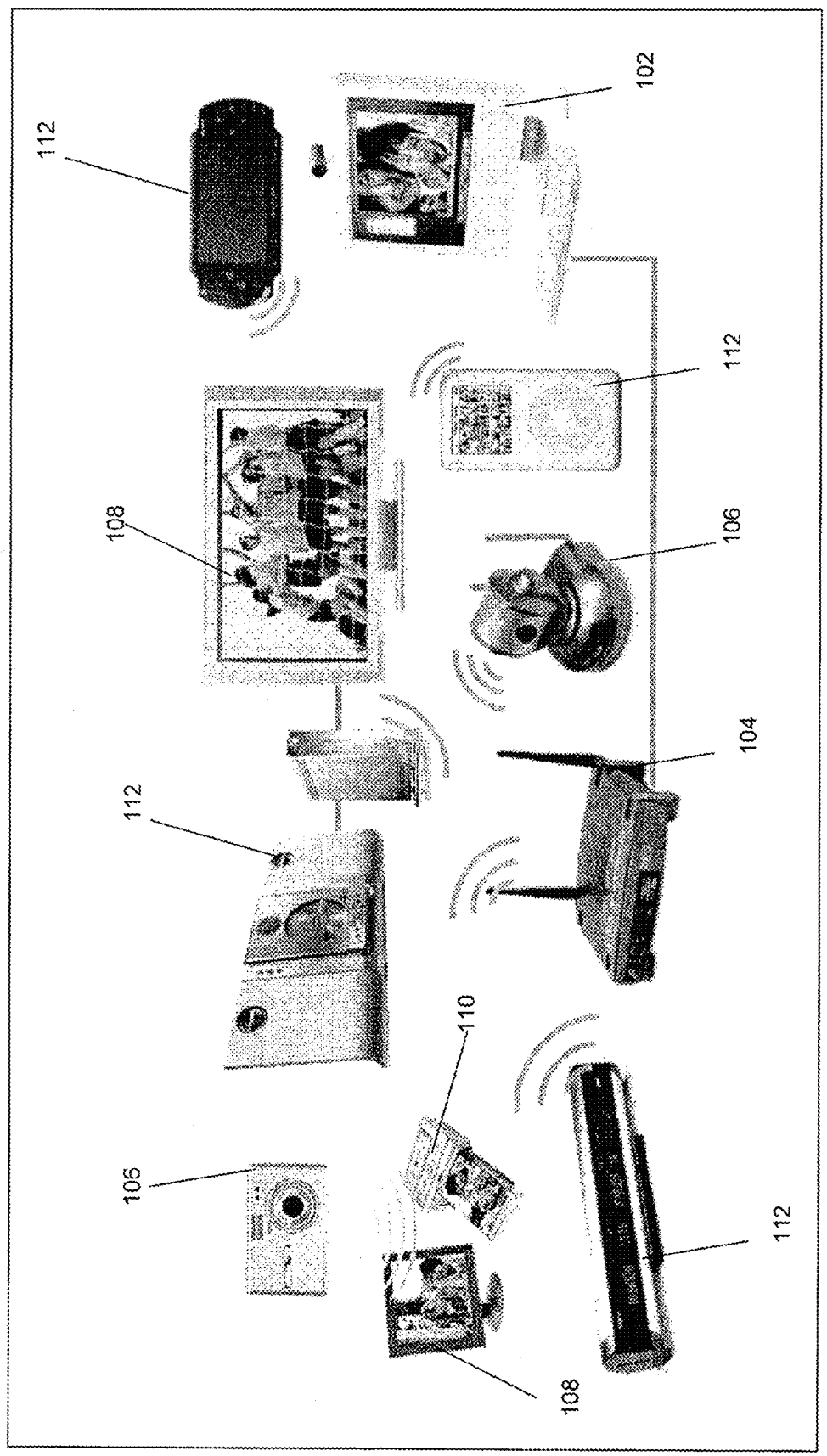
FIG. 1 shows an example prior art collection of hardware devices operable to communicate over a Wi-Fi network.

The present invention comprises a system and method for enabling owners of Wi-Fi hotspots (e.g., residential hotspots) to participate in a distributed wireless network using their existing home broadband Wi-Fi connections. In a preferred embodiment, an information processor configured as a server computer distributes software to registered users that enables a typical, prior art residential wireless router to operate as a network router, such as used by parties who share and resell Wi-Fi, as known in the art. When the residential router is properly equipped with the software provided by the server and connected to the internet, the router registers itself as part of a wider network, and allows access to the Internet through that router for other users.

More particularly, each registered user is assigned a unique user name and password. The user name and password are used to authorize a user to access other registered users' wireless bandwidth. The server stores each user's user name and password in a database, and authorizes a user to access another user's bandwidth after receiving a request that includes the proper authorization information. Individual users of network bandwidth, particularly those who have residential installations and who possess excess bandwidth, preferably register with the server in order to permit other people to use at least some of their excess bandwidth. Thus, registered users who are authorized by the server computer preferably access Wi-Fi connections of other members of the community. Once authorized, users who are physically located beyond their own residential Wi-Fi transmission range can access other members' Wi-Fi connections via the other users' respective access points.

In an one embodiment, a fee is charged to a user who is not registered with the server in order to enable the non-registered user to access a registered user's Wi-Fi connection. Preferably, a portion of the fee is distributed to the user providing the respective bandwidth. In one embodiment, the amount remunerated to the respective user is equal to one half of the fee. In an alternative embodiment, the fee is shared among all registered users. Registered users who contribute bandwidth and who have assigned user names and passwords are preferably able to share other users' bandwidth for no additional fee. It is envisioned herein, therefore, that a community of users is defined.

In another embodiment, VoIP service is provided via the at least two respective wireless gateway devices. A fee may be charged to anyone who uses the VoIP devices to access Wi-Fi points of registered users. The fee may be shared by all registered users, or may be portioned to respective registered users who provide bandwidth.

In a preferred embodiment a business method is provided that permits the sharing, selling and controlling of a group of existing Wi-Fi hotspots. For example, end users who have excess bandwidth agree to permit each other to use the others' bandwidth for no extra fee. Any party who desires to use a registered user's wireless bandwidth, and yet does not have any wireless bandwidth to contribute, is preferably charged a small access fee. Those who have wireless bandwidth to contribute are preferably not charged a fee. Further, the control of the collective networks is managed by a unified software layer, which is preferably added to existing DSL/Cable or other internet access installations.

In a preferred embodiment, agreements between ISPs in various countries are executed with the proprietor of the present invention in order to license the use of technology. The respective ISPs can be promoted, as can the proprietor of the present invention. The ISP could then be used as a local partner to resell other services.

In one embodiment, Wi-Fi phone access via VoIP is provided and, depending upon whether a user has contributed bandwidth, a small access fee may be charged. Further, a software management layer monitors network activity, identifies users of the network, records the usage and handles accounting of the usage. In this manner, members may place VoIP telephone calls using any participating hotspot. Furthermore, a number of applications are envisioned, including the use of the network with laptops, PDA's digital cameras, MP3 devices as well as providing roaming capabilities. Roaming entails maintaining a connection even if a user leaves one hotspot and appears in another. Simply joining a network controlled by such a software layer allows the network to grow rapidly as new Wi-Fi contributors over bandwidth in exchange for access.

Figure 2:
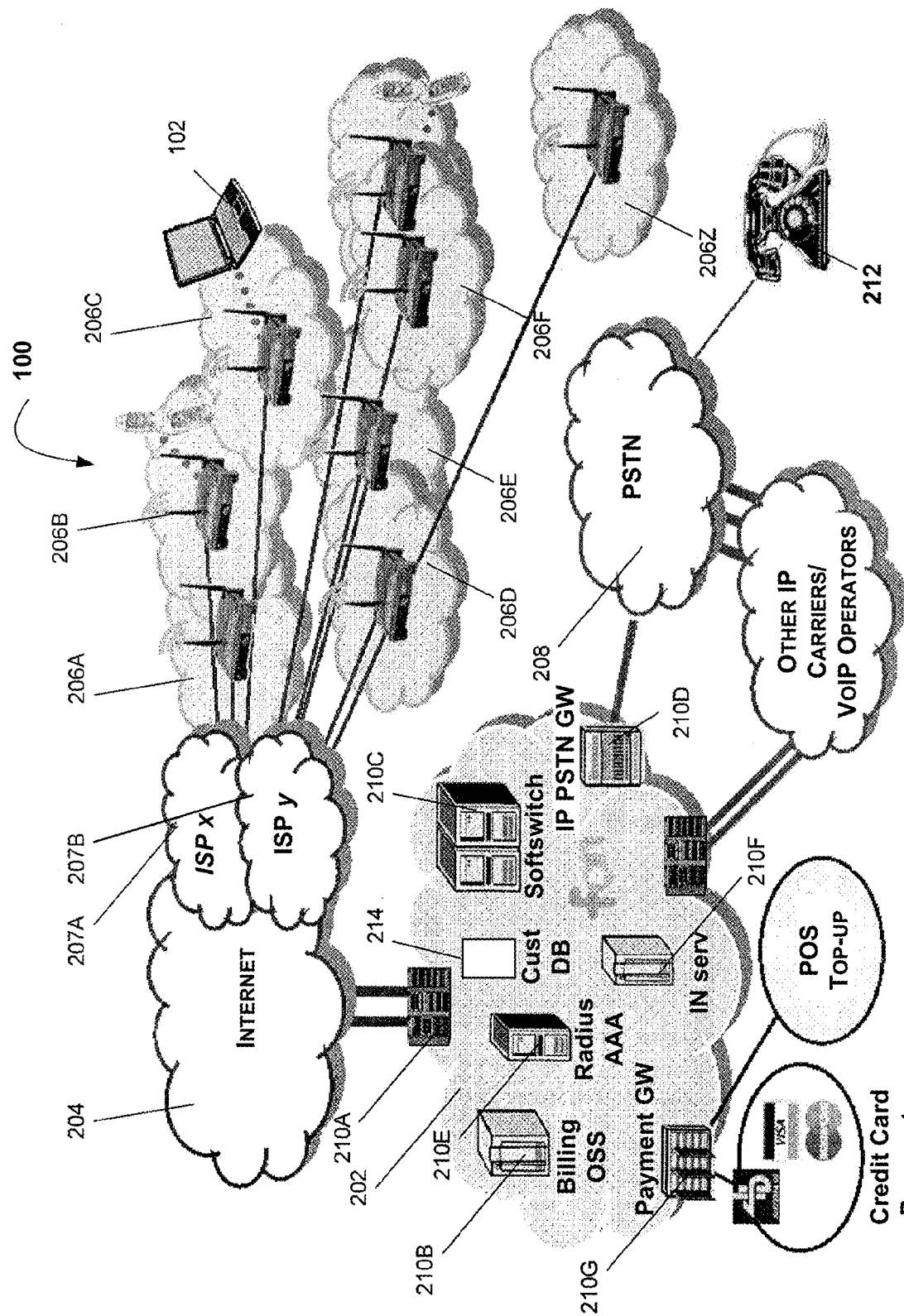
FIG. 2 is a block diagram that illustrates an example networked arrangement of parties associated with the present invention.

Continuing with reference to the drawings, FIG. 2 shows an example hardware arrangement in a preferred embodiment of the present invention and referred to generally as system 100. The embodiment shown in FIG. 2 includes a plurality of hardware devices and corresponding network configurations that are operable in accordance with the teachings herein. Of course, one skilled in the art will recognize that many variations on the precise hardware configuration of the present invention may be possible, and are envisioned herein without departing from the spirit of the present invention. For example, a plurality of information processors 210A-210G are shown in FIG. 2. It is possible that all of the functionality performed by processors 210A-210G can be accomplished by a single information processor 210.

In the embodiment shown in FIG. 2, system 100 comprises a plurality of networks that are configured to interact, in accordance with the teachings herein. For example, proprietor network 202 is operable to manage much of the functionality described herein. Further, proprietor network 202 is coupled to global communication network 204, which may be the internet. Multiple Wi-Fi networks 206A-206Z are further provided, each preferably operated by end users that have internet access provided, for example, by ISP 207A-207B. Also illustrated in FIG. 2 is public switched telephone network ("PSTN") 208.

Proprietor network 202 preferably comprises at least one information processor 210A-210G that is/are configured to provide various functionalities in various contexts. For example, information processor 210A is operable as a hypertext transport protocol ("HTTP") server. Processor 210B is configured, for example as server operable to handle billing and other back-end processing tasks, such as operational support systems ("OSS"). Processors 210C and 210D are preferably operable to perform switching and conversion operations, for example, in accordance with transmitting digital VoIP communications to analog telephones 212, to be transmitted over PSTN 208. Other information processors may be included, for example, processor 210E operates as a Radius server for user authentication, as known in the art, and processor 210F to operate as an IN serv device.

In a preferred embodiment, Wi-Fi VoIP provided in accordance with the teachings herein is based on the so-called "Asian Wi-Fi" and dual Wi-Fi/GSM phones. The proliferation of Wi-Fi hotspots in Asia is significantly higher than elsewhere in the world.

Continuing with reference to the example hardware embodiment illustrated in FIG. 2, information processor 210G provides a payment gateway that enables various parties associated with the present invention make financial payments to the proprietor of network 202 over the internet. Various forms of payment are envisioned herein, such as credit card payments, and various forms of e-cash payments, such as provided by PAYPAL or other known internet financial services. By receiving payments, for example, via information processor 210G, a business method is provided in which proprietors of network 202 earns revenue from various parties, typically those who do not contribute bandwidth for internet sharing. In an alternative embodiment, an end user desiring to be availed of the benefits of the present invention elects to send an electronic payment to information processor 210G which covers the cost for hardware, software and internet services. For example, a user sends to information processor 210G a payment for one full year of internet access (provided by an ISP 207), as well as hardware and software (and related shipping and other fees) for providing a gateway 104. The proprietor of information processor 210G thereafter distributes the funds to the appropriate party or parties to enable the end user to establish his Wi-Fi network 206. Thereafter, the end user installs software provided by the proprietor of network, substantially as described below.

In a preferred embodiment, information processor 210B operates including as an internet web server that is operable to access and update a database 214. Database 214 preferably stores information directed to end users, respective ISP's, end user bandwidth usage and statistics, or the like. When end users connect to a gateway, a reference to database 214 is preferably made to authenticate the user.

Information processor 210B preferably accesses communication network 204 and communicates with processors 102 in order to distribute software and implement the teachings herein. Preferably, processors 204 and information processor(s) 210 communicate via the known communications protocol, Transmission Control Protocol/Internet Protocol "TCP/IP." In this way, content can be transmitted to and from the devices 210 and 102, and commands can be executed to enable the various functions described herein.

Information processors 102/210 are any devices that are capable of sending and receiving data across communication network 204, e.g., mainframe computers, mini computers, personal computers, laptop computers, personal digital assistants (PDA) and internet access devices such as Web TV. In addition, information processors 102/210 are preferably equipped with a web browser, such as MICROSOFT INTERNET EXPLORER, NETSCAPE NAVIGATOR, MOZILLA FIREFOX, or the like. Thus, as envisioned herein, information processors 102/210 are devices that can communicate over a network and can be operated anywhere, including, for example, moving vehicles.

The nature of the present invention is such that one skilled in the art of writing computer executable code (i.e., software) can implement the described functions using one or more of a combination of popular computer programming languages and developing environments including, but not limited to C, C++, Visual Basic, JAVA, PHP, HTML, XML, ACTIVE SERVER PAGES, JAVA server pages, servlets, MICROSOFT.NET, and a plurality of various web site development applications.

For example, data may be configured in a MICROSOFT EXCEL spreadsheet file, as a comma delimited ASCII text file, as a MICROSOFT SQL SERVER compatible table file (e.g., MS-ACCESS table), or the like. In another embodiment, data may be formatted as an image file (e.g., TIFF, JPG, BMP, GIF, or the like). In yet another embodiment, data may be stored in an ADOBE ACROBAT PDF file. Preferably, one or more data formatting and/or normalization routines are provided that manage data received from one or a plurality of sources. In another example, data are received that are provided in a particular format (e.g., MICROSOFT EXCEL), and programming routines are executed that convert the data to another formatted (e.g., ASCII comma-delimited text).

It is contemplated herein that any suitable operating system can be used on processors 210 and 102, for example, DOS, WINDOWS 3.x, WINDOWS 95, WINDOWS 98, WINDOWS NT, WINDOWS 2000, WINDOWS ME, WINDOWS CE, WINDOWS POCKET PC, WINDOWS XP, MAC OS, UNIX, LINUX, PALM OS, POCKET PC or any other suitable operating system. Of course, one skilled in the art will recognize that other software applications are available in accordance with the teachings herein, including, for example, via JAVA, JAVA Script, Action Script, Swish, or the like.

Moreover, a plurality of data file types is envisioned herein. For example, the present invention preferably supports various suitable multi-media file types, including (but not limited to) JPEG, BMP, GIF, TIFF, MPEG, AVI, SWF, RAW or the like (as known to those skilled in the art).

Figure 3:
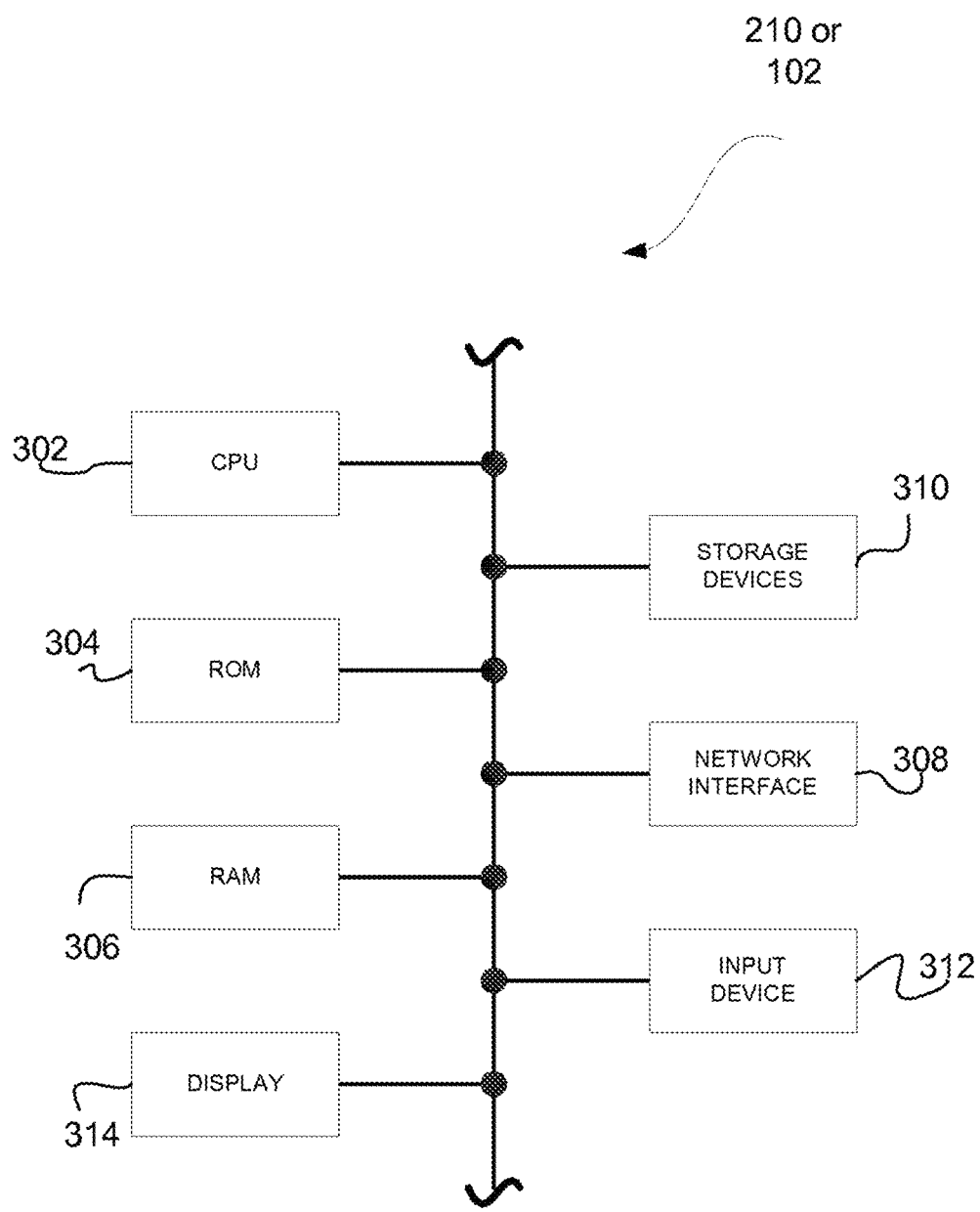
FIG. 3 illustrates the functional elements of an information processor.

FIG. 3 illustrates the functional elements of information processors 102 and/or 210, and that include one or more central processing units (CPU) 302 used to execute software code and control the operation of information processors 102 and/or 210, read-only memory (ROM) 304, random access memory (RAM) 306, one or more network interfaces 308 to transmit and receive data to and from other computing devices across a communication network, storage devices 310 such as a hard disk drive, floppy disk drive, tape drive, CD ROM or DVD for storing program code, databases and application data, one or more input devices 312 such as a keyboard, mouse, track ball, magnetic card reading device, bar code reading device, microphone or the like, and a display 314.

The various components of information processors 102 and/or 210 need not be physically contained within the same chassis or even located in a single location. For example, storage device 310 may be located at a site which is remote from the remaining elements of information processor 102 or 210, and may even be connected to CPU 302 across communication network 204 via network interface 308. Information processors 102/210 preferably includes a memory equipped with sufficient storage to provide the necessary databases, forums, and other community services as well as acting as a web server for communicating hypertext markup language (HTML), FLASH, Action Script, Java, Active Server Pages, Active-X control programs. Information processors 102/210 are arranged with components, for example, those shown in FIG. 3, suitable for the expected operating environment. The CPU(s) 302, network interface(s) 308 and memory and storage devices are selected to ensure that capacities are arranged to accommodate expected demand.

As used herein, the term, "module" refers, generally, to one or more discrete components that contribute to the effectiveness of the present invention. Modules can operate or, alternatively, depend upon one or more other modules in order to function.

Figure 4:
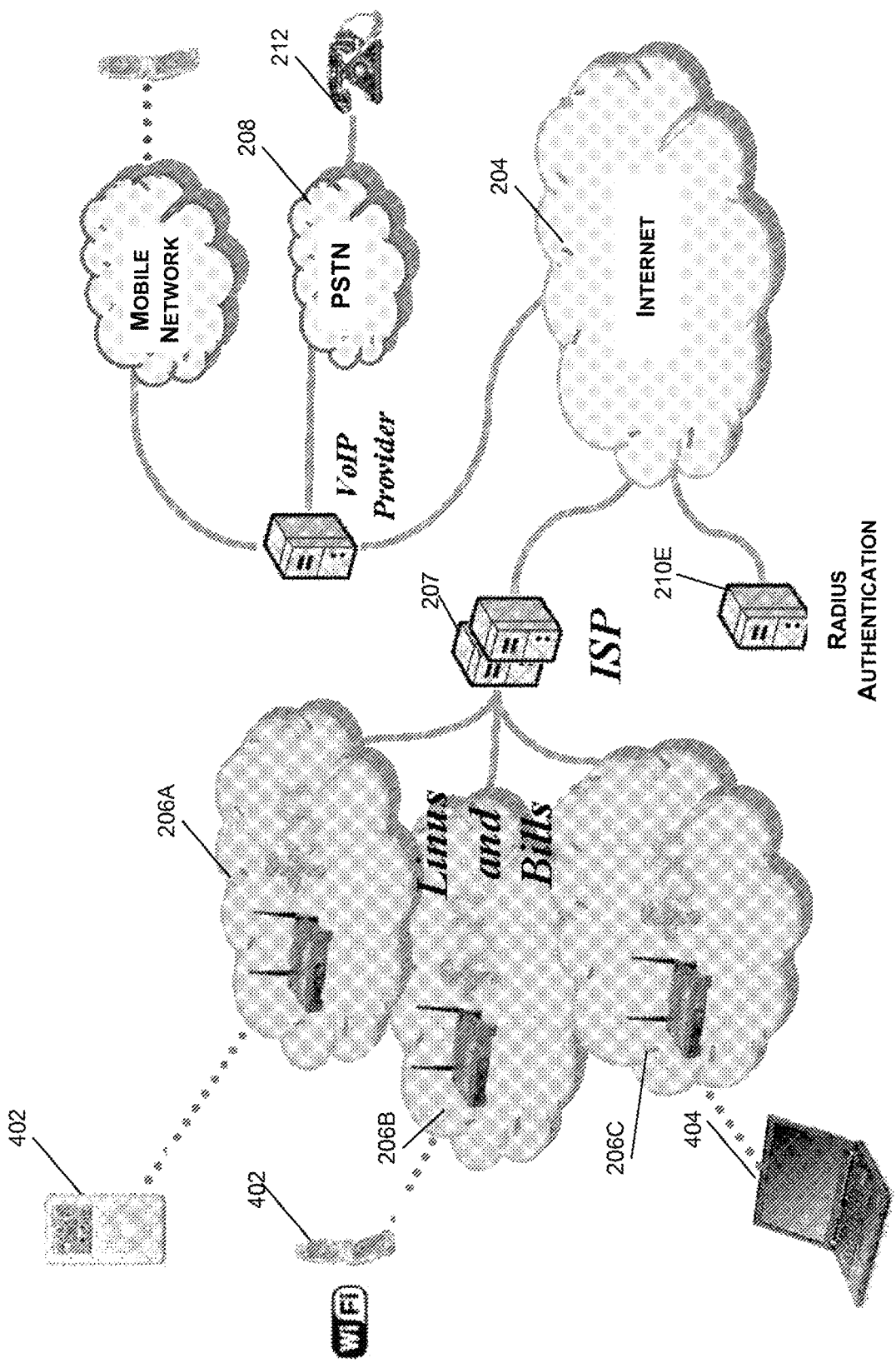
FIG. 4 is a block diagram that illustrates an example networked arrangement of parties associated with the present invention.

FIG. 4 is a block diagram that illustrates an example networked arrangement of parties associated with the present invention. As noted with reference to FIGS. 1 and 2, the present invention is operable over one or more communication networks, such as the internet, a wide area network, a local area network or the like. Thus, the present invention enables various parties to communicate information to each other that is useful or necessary to execute the teachings herein. One skilled in the art will recognize that the internet enables the convenient and rapid exchange of information, thereby enabling parties to transmit information.

As shown in FIG. 4, various parties connect to networks 206A, 206B and 206C. Some of the parties connecting contribute bandwidth, in accordance with the teachings herein, and some do not. In the example shown in FIG. 4, parties 402 contribute bandwidth and preferably operate wireless devices without paying an additional fee. Party 404, in contrast, does not contribute bandwidth and, accordingly, pays a small access fee in order to use his wireless device.

Preferably, party 404 pays for internet access via traditional prior art billing and/or prepaid mechanisms. Users 402 may pay or "top-up" their accounts online, by premium short messaging service ("SMS"), at hotspots and through same channels as mobile top-ups (ATMs, Retailers' point of service ("POS"), scratch cards, . . . ), or the like as known in the art. Preferably, priority is given to low cost topping-up methods (online, electronic top-ups . . . ) to keep blended commission rates as low as possible.

In accordance with the spirit of the invention, communications are available to emphasize an element of social liberty and movement that appeals to the users of open source software and systems. For example, it is believed by the inventor that proponents of the LINUX operating system will be eager to avail themselves of bandwidth sharing and distributed Wi-Fi access in accordance with the teachings herein.

Figure 5:
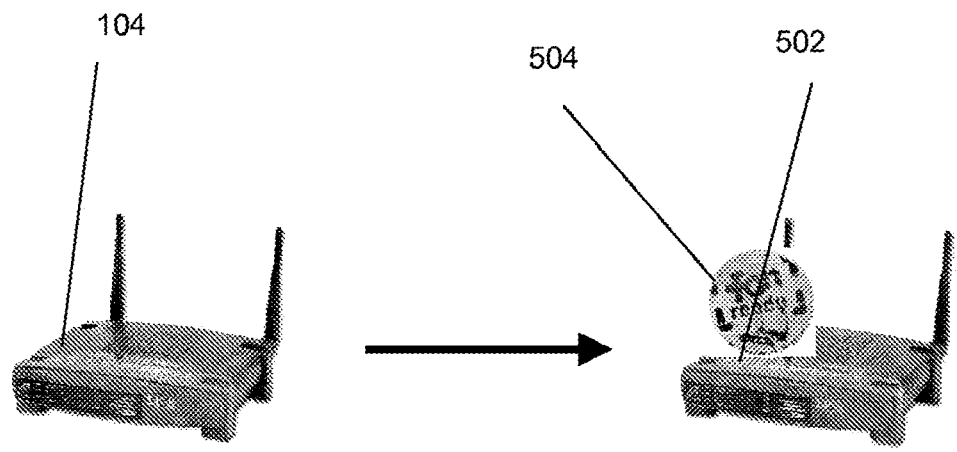
FIG. 5 illustrates an example embodiment in which a prior art gateway is upgraded to a gateway which is operable to enable owners to share bandwidth in accordance with the teachings herein.

FIG. 5 illustrates an example embodiment in which a prior art gateway 104 is upgraded to a gateway 502 which is operable to enable owners to share bandwidth in accordance with the teachings herein. Preferably, a user 402 establishes a communication session with information processor 210 in order to download software 504 via the internet 204. Once the software 504 has been downloaded, the user preferably updates his gateway 104, for example by a process known in the art as "flashing" software 504 to gateway 104. When the software 504 is flashed to the gateway 104, the gateway effectively becomes gateway 502 and is operable to enable users 402 to share bandwidth and have remote internet access outside of the normal range of gateway 104. In one embodiment, software 504 is compatible with a plurality of proprietary devices (e.g., Linksys WRT54G), but various other gateway 502 devices, include LINUX-based models can be supported.

Furthermore, coverage can be extended with a relatively inexpensive patch antenna that users can use to receive Wi-Fi where the antenna is installed. In ideal conditions, the coverage extends up to 150 meters.

In this way, connectivity is preferably provided over great distances, and provides a great opportunity for ISP's 207 to increase their market share. Software 504, once installed in customers Wi-Fi gateway, provides secure authentication with information processor 210, in order to enable parties 402 and 404 to access bandwidth and communicate over internet 204.

In case users 404 desires Wi-Fi access, payment is preferably processed through payment gateway 210G, and, in one business method, half (50%) of revenues are provided directly to the owner of the Wi-Fi access gateway 206.

Preferably and initially, two sources of revenue are envisioned. One involves selling Wi-Fi access to customers 404 who do not contribute bandwidth. The other involves Wi-Fi VoIP monthly fixed and calling revenues.

Notwithstanding these two sources of revenue, various other business arrangements are envisioned herein. For example, free national roaming is provided to existing gateway 502 owners who share bandwidth. For those owners who share bandwidth but do not want roaming, a portion of roaming fees, for example, twenty-five percent are charged. Similar business method arrangements are envisioned by the inventor, without departing from the spirit and teachings herein.

With regard to internet access to customers 404, fees can be charged for internet access per hour, per day and per month. Further, planned tariffs include revenue for payable via premium short message services and structured for various time periods, such as 30 minutes intervals, 24-hour intervals and monthly intervals. Further, for users 402/404 who use the present invention for Wi-Fi VoIP, handsets are configured to operate with gateway 502, and revenue is earned via integrated postpaid and prepaid contracts.

Another revenue stream envisioned herein includes advertising revenue via various display screens, including initial login screens. Moreover, portions of revenue earned from purchases made for Wi-Fi equipment and devices can also be realized.

Also in an example embodiment, a proprietor of the present invention enters into an agreement with an ISP 207 to license the use of software 504. By entering into a license arrangement wherein ISP 207 distributes software 504, the ISP 207 effectively promotes the proprietor of information processor 202, and is similarly promoted to users 402 and 404 who establish wireless internet sessions using bandwidth provided by ISP 207. Thus, in one embodiment, ISP 207 is effectively a local partner to resell other services, such as VoIP using Wi-Fi.

It is envisioned herein that hundreds of thousands and even millions of gateways 502 can be employed in a single country or over a geographic region to provide wireless connectivity without sacrificing bandwidth, without great regard to density and resilience. It is estimated, for example, 2 million gateway 502 "hotspots" would be needed to obtain good urban coverage throughout Europe and United States. By redistributing bandwidth according to the teachings herein, revenue can be generated by users 404, and customer demand for low cost wireless telephone service can further be satisfied.

In one embodiment, providing VoIP telephone service in accordance with the teachings herein replaces cellular telephone service. Users can make VoIP telephone calls without burdensome cellular telephone service contracts, that typically comprise monthly access fees for a fixed number of minutes, and expensive usage charges in case that fixed number is exceed by actual use. Further, by providing VoIP to users 404, a revenue stream that would otherwise belong to GSM service can be obtained. Further providing VoIP service in accordance with the teachings herein, users 404 can be availed of worldwide telephone service, without the high roaming charges typically associated with wireless cellular telephone service carriers.

Another benefit of the present is that users 402 and distributors promote the service. In one embodiment, a referral/reward program is provided in which users 402 that establish new ISPs 207 as partners earn revenue or rewards. It is envisioned herein that, in addition to distributing the software 504 via web server 210A, various partners (e.g., ISPs 207, gateway hardware manufacturers and/or distributors) offer broadband internet access and/or pre-configured hardware and software, such as Wi-Fi gateway 502. Moreover, VoIP service can be similarly provided, for example, by distributing pre-configured units that are operable in various hotspots configured via gateway 502. Also, it is envisioned herein that various partners, such as hotels, restaurants, cafes or the like, that provide Wi-Fi connectivity can similarly share bandwidth and provide wireless VoIP, just as residential consumers.

In accordance with a preferred business method, a form of joint marketing is envisaged rather than a prior art commission. By displaying marketing materials that identifies gateway 502, pre-configured broadband internet access, and/or Wi-Fi equipment, demand for the benefits provided in accordance with the teachings herein will be raised.

Thus, in accordance with a preferred embodiment, community members 402 share their respective Wi-Fi bandwidth with the rest of the community 402 and general public at no direct cost to the proprietor of information processor 210. Information processor 210 preferably controls Wi-Fi gateways 206 via software 504, as the software 504 effectively transforms gateways 104 into gateways 206. By utilizing VoIP service providers, VoIP services, E.164 geographic and IP specific numbers and full interconnection with PSTN and mobile networks are similarly provided.

In a preferred embodiment, users 402 maintain at least two telephone devices, a Wi-Fi VoIP telephone unit, and a landline or cellular telephone. Alternatively, users 402 can maintain a telephone hand unit that is operable to switch between VoIP and cellular service. In this way, in case coverage is not being properly provided, users 402 can be contacted to make corrections, adjustments or the like to ensure that bandwidth is properly distributed via gateway 502. Preferably, users 402 maintain at least two different telephone numbers and two different e-mail addresses in order to provide a level of redundancy and to ensure that users 402 can be contacted at any given time.

In an alternative embodiment, a proprietor of information processor 210 provides, for example, through a mobile virtual network operator's ("MVNO") cellular service for users 402. In this alternative embodiment, users 402 will have only one telephone number, and seamless switching (referred to in the art as a "hand-over") between Wi-Fi VoIP and cellular GSM service is provided.

Thus, the present invention capitalizes on current trends in the traditional telecommunications industry. A flexible and distributed global network is provided, without a requirement for large capital investment, as software 504 effectively acts as a glue that links existing Wi-Fi access points. As the density of gateways 502 increases, near-ubiquitous internet access and affordable VoIP voice calls for are available. Network value preferably increases as each member 402 is added.

The various embodiments describe herein enable the linking of millions of Wi-Fi access points (i.e., gateways 502) into a single unified network. Although the present invention is described herein with reference to Wi-Fi, the invention is not so limited. For example, Wi-Fi is expected to be replaced in the near future with WiMAX, and WiMAX gateways 502 will be deployed as Wi-Fi, not GSM. When WiMAX routers (i.e., providing gateways 104), the present invention will provide software for WiMAX routers, that will effectively increase the wide area coverage over Wi-Fi routers. Thus, a linked network in accordance with the teaching herein has the potential to soon become the largest global network of hotspots in the world and will be able to compete with the large-scaled cellular telephone service providers and hotspot operators.

Also, as shown in FIG. 1, various computing devices are capable of Wi-Fi access and are envisioned herein. For example, digital cameras, IPODS, various gaming devices can all benefit from a unified Wi-Fi network. By sharing bandwidth at a single installation, for example, a personal residence, users 402 can travel over large distances and still enjoy remote network access to the internet.

Although the present invention has been described in relation to particular embodiments thereof, many other variations and modifications and other uses will become apparent to those skilled in the art. It is preferred, therefore, that the present invention be limited not by the specific disclosure herein.

I claim:

1. A system providing a distributed wireless network, the system comprising:
(A) a server, including:
at least one information processor; and
at least one database associated with said at least one information processor, wherein said at least one database stores authentication information associated with a plurality of registered users; and
(B) a plurality of wireless gateway devices, each providing corresponding wireless access to corresponding bandwidth, wherein
a first wireless gateway device of said plurality of wireless gateway devices provides first wireless access to the distributed wireless network via first bandwidth, and wherein
a second wireless gateway device of said plurality of wireless gateway devices provides second wireless access to the distributed wireless network via second bandwidth, said second wireless gateway device being distinct from said first wireless gateway device, and wherein
said first wireless gateway device being associated with a first registered user of said plurality of registered users, and
wherein the server:
(a) receives, from a first computing device associated with the first registered user, a first request to access the distributed wireless network via said second wireless gateway device, and wherein the first request includes authentication information associated with the first registered user; and
(b) authorizes, based on the first request and on said authentication information in said at least one database, the first computing device to access the distributed wireless network via the second wireless gateway device, wherein said first registered user is authorized to access the distributed wireless network via the second wireless gateway device in (b) based, at least in part, on other users being given access to the distributed wireless network via said first wireless gateway device,
wherein the second wireless gateway device is associated with a second registered user of said plurality of registered users, and
wherein at least some particular users of said plurality of registered users are registered based on said at least some particular users being provided with wireless access devices by at least one network service provider,
wherein the first bandwidth is provided by a first network service provider, and wherein the second bandwidth is provided by a second network service provider.

2. The system of claim 1, wherein said distributed wireless network provides voice-over-IP (VoIP) service to at least some of said plurality of registered users.

3. The system of claim 1, wherein the server is distinct from the at least one network service provider.

4. The system of claim 1, wherein the first wireless gateway device was provided to the first registered user.

5. The system of claim 4, wherein the first wireless gateway device was provided to the first registered user by the first network service provider.

6. The system of claim 5, wherein the first registered user was registered based on said first registered user being provided with said first wireless gateway device by the first network service provider.

7. The system of claim 1, wherein the second wireless gateway device was provided to the second registered user.

8. The system of claim 7, wherein the second wireless gateway device was provided to the second registered user by the second network service provider.

9. The system of claim 8, wherein the second registered user was registered based on said second registered user being provided with said second wireless gateway device by the second network service provider.

10. The system of claim 1, wherein said first network service provider is distinct from said second network service provider.

11. The system of claim 1, wherein particular bandwidth provided by a particular wireless gateway device of said plurality of wireless gateway devices corresponds to a particular wireless access hotspot.

12. The system of claim 1, wherein the plurality of wireless gateway devices provide a corresponding plurality of wireless access hotspots.

13. The system of claim 1, wherein the corresponding bandwidth provided by the plurality of wireless gateway devices comprises a plurality of wireless access hotspots.

14. The system of claim 1, wherein the first wireless access provided by the first wireless gateway device corresponds to a first wireless access hotspot.

15. The system of claim 14, wherein the second wireless access provided by the second wireless gateway device corresponds to a second wireless access hotspot distinct from said first wireless access hotspot.

16. A system providing a distributed wireless network, the system comprising:
(A) a server, including:
at least one information processor; and
at least one database associated with said at least one information processor, wherein said at least one database stores authentication information associated with a plurality of registered users; and
(B) a plurality of wireless gateway devices, each providing a corresponding wireless access hotspot with corresponding wireless access to corresponding bandwidth, wherein
a first wireless gateway device of said plurality of wireless gateway devices provides a first wireless access hotspot, wherein said first wireless access hotspot provides first wireless access to the distributed wireless network via first bandwidth, and wherein
a second wireless gateway device of said plurality of wireless gateway devices provides a second wireless access hotspot, wherein said second wireless access hotspot provides second wireless access to the distributed wireless network via second bandwidth, said second wireless access hotspot being distinct from said first wireless access hotspot, and wherein
said first wireless gateway device being associated with a first registered user of said plurality of registered users, and
wherein the server:
(a) receives, from a first computing device associated with the first registered user, a first request to access the distributed wireless network via said second wireless access hotspot, and wherein the first request includes authentication information associated with the first registered user; and (b) authorizes, based on the first request and on said authentication information in said at least one database, the first computing device to access the distributed wireless network via the second wireless access hotspot, wherein said first registered user is authorized to access the distributed wireless network via the second wireless access hotspot in (b) based, at least in part, on other users being given access to the distributed wireless network via said first wireless access hotspot, wherein the second wireless gateway device is associated with a second registered user of said plurality of registered users, and wherein at least some particular users of said plurality of registered users are registered based on said at least some particular users being provided with wireless access devices by at least one network service provider, wherein the first bandwidth is provided by a first network service provider, and wherein the second bandwidth is provided by a second network service provider.

17. The system of claim 16, wherein said distributed wireless network provides voice-over-IP (VoIP) service to at least some of said plurality of registered users, as least in part by one or more wireless access hotspots provided by the plurality of wireless gateway devices.

18. A system providing a distributed wireless network, the system comprising:

(A) a server, including:
  at least one information processor; and
  at least one database associated with said at least one information processor, wherein said at least one database stores authentication information associated with a plurality of registered users; and (B) a plurality of wireless hotspots provided by a corresponding plurality of wireless gateway devices, each of said wireless hotspots with corresponding wireless access to corresponding bandwidth, wherein said plurality of wireless gateway devices includes a first wireless gateway device and a second wireless gateway device, wherein
  said first wireless gateway device provides a first wireless hotspot, wherein said first wireless hotspot provides first wireless access to the distributed wireless network via first bandwidth, and wherein
  said second wireless gateway device provides a second wireless hotspot, wherein said second wireless hotspot provides second wireless access to the distributed wireless network via second bandwidth, said second wireless hotspot being distinct from said first wireless hotspot, and wherein
  said first wireless gateway device being associated with a first registered user of said plurality of registered users, and
  wherein the server:
    (a) receives, from a first computing device associated with the first registered user, a first request to access the distributed wireless network via said second wireless hotspot, and wherein the first request includes authentication information associated with the first registered user; and
    (b) authorizes, based on the first request and on said authentication information in said at least one database, the first computing device to access the distributed wireless network via the second wireless access hotspot, wherein said first registered user is authorized to access the distributed wireless network via the second wireless access hotspot in (b) based, at least in part, on other users being given access to the distributed wireless network via said first wireless hotspot,
    wherein the second wireless gateway device is associated with a second registered user of said plurality of registered users, and
    wherein at least some particular users of said plurality of registered users are registered based on said at least some particular users being provided with wireless access devices by at least one network service provider,
    wherein the first bandwidth is provided by a first network service provider, and wherein the second bandwidth is provided by a second network service provider.

19. The system of claim 18, wherein said distributed wireless network provides voice-over-IP (VoIP) service to at least some of said plurality of registered users, as least in part by one or more of the plurality of wireless hotspots.

* * * * *